B. F. JOSLYN.
BREECH LOADING FIREARM.
No. 433. Reissued Mar. 3, 1857.
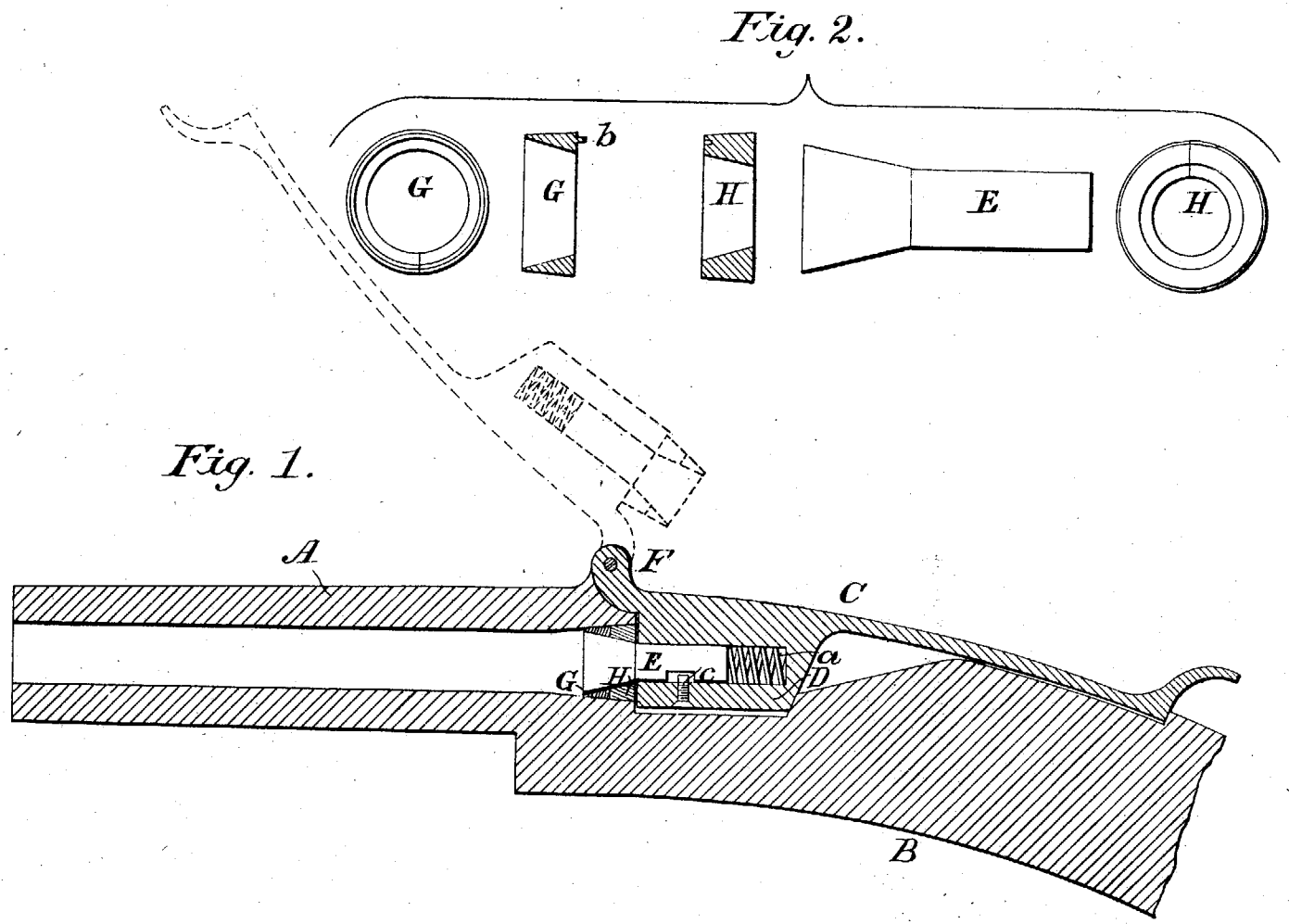
Witnesses:
Henry Howson
William E Walton
Inventor:
Benj F Joslyn

UNITED STATES PATENT OFFICE.

B. F. JOSLYN, OF WORCESTER, MASSACHUSETTS.

IMPROVEMENT IN BREECH-LOADING FIRE-ARMS.

Specification forming part of Letters Patent No. 13,507, dated August 28, 1855; Reissue No. 433. dated March 3, 1857.

*To all whom it may concern:*

Be it known that I, B. F. JOSLYN, of the city and county of Worcester, and State of Massachusetts, have invented certain new and useful Improvements in Breech-Loading Fire-Arms; and I do hereby declare that the following is a full, clear, and exact description of the same, reference being had to the accompanying drawings, which form a part of this specification, in which—

Figure 1 is a sectional view of sufficient of a fire-arm to show my improvements, and in Fig. 2 are several detached views of the pin and expanding rings.

The nature of my invention consists in providing breech-loading fire-arms with a movable breech-pin formed by a cone-headed pin embraced by two or more expanding rings, so that the greater the explosion in the barrel the tighter the breech becomes; and in making the interior of the breech-pin cone-shaped, it being much easier entered or removed; also, in combining the said pin with the radial or hinged breech, substantially as shown and described.

To enable others skilled in the art to make and use my invention, I will now proceed to describe its construction and operation.

A is the barrel of the fire-arm; B, a portion of the stock; C, the radial breech connected to the barrel by the joint F. The projecting part D of the breech fits (when down) at one end against the inclined inside of the stock, the other end bearing against the end of the barrel. Within the piece D, and central with the bore of the barrel, is the pin E, one end of which bears against the spiral spring *a*, the tapered end projecting a short distance into the barrel. The rings G and H are turned on the outside edge, so as to fit the interior of the cone-shaped end of the barrel, the inside also cone-shaped and fitting accurately the head of the pin E. These rings are cut open in one place, as seen in Fig. 2, so as to allow them to expand and contract after the manner of metallic rings in the pistons of steam-engines, the small pin or dowel *b* maintaining them in such a position with each other that the cut or opening of one ring does not coincide with that of the other. A small pin, screwed into the lower part of the projection D, fits with its point into the slot in the pin E, so as to prevent the latter from turning, at the same time allowing it a slight longitudinal movement. The radial breech C with its pins and rings being raised, as shown in red lines, the cartridge may be inserted into the end of the barrel, and the radial breech again brought down to the position shown in the drawings, when the fire-arm is ready to be discharged. The power being ignited by any of the ordinary contrivances, the first instantaneous act of the expanded air and gas will be to drive the pin E toward the interior of the projection D on the breech C, and as the rings are prevented from moving backward by the end of the said projection, it necessarily follows that the coned head of the pin must cause the rings to expand, and consequently to fit tight to both the inside of the barrel and outside of the cone-head of the pin, effectually preventing all escape of air or gas toward the breech, and causing the explosive force to be more intense than in ordinary breech-loading fire-arms. Immediately after the discharge the spiral spring *a* by its recoil causes the pin and expanding rings to assume their former position.

What I claim, and desire to secure by Letters Patent, is—

A cone-headed pin with two or more expanding rings, substantially as shown and described, for the purpose specified, and in making the exterior of a breech-pin, as described, cone-shaped, for the purpose as above set forth, also combining the same with the radial or hinge breech, substantially as shown and described.

B. F. JOSLYN. [L. S.]

Witnesses:

G. ESTABROOK SMITH,

LEWIS THAYER.